United States Patent [19]
Gaudreault et al.

[11] Patent Number: 6,135,175
[45] Date of Patent: Oct. 24, 2000

[54] TREE HARVESTER PROVIDED WITH A ROTATABLE WORKTABLE

[75] Inventors: Pierre Gaudreault, Charlesbourg; Rejean Tremblay, Saint-Félicien, both of Canada

[73] Assignee: Denharco, Inc., Quebec, Canada

[21] Appl. No.: 09/169,685

[22] Filed: Oct. 9, 1998

[51] Int. Cl.[7] .................................................. A01G 23/08
[52] U.S. Cl. .................... 144/4.1; 144/34.1; 144/336; 414/688; 414/729; 180/9.5; 280/6.153
[58] Field of Search .................... 144/4.1, 24.13, 144/34.1, 34.5, 335, 336, 338, 343; 414/685, 688, 694, 723, 729; 280/6.153; 180/9.5, 41, 9.52

[56] References Cited

U.S. PATENT DOCUMENTS

| | | |
|---|---|---|
| 3,590,760 | 7/1971 | Boyd ........................................ 144/338 |
| 3,618,647 | 11/1971 | Stuart, Jr. ................................ 144/338 |
| 3,710,834 | 1/1973 | Jarck . |
| 3,720,248 | 3/1973 | Melgren .................................... 144/338 |
| 3,805,859 | 4/1974 | Kessler et al. . |
| 3,812,892 | 5/1974 | Jasinski et al. . |
| 3,889,729 | 6/1975 | Pinomaki . |
| 3,894,568 | 7/1975 | Windsor . |
| 3,999,582 | 12/1976 | Allen et al. . |
| 4,034,785 | 7/1977 | Tucek . |
| 4,119,222 | 10/1978 | Kaarnametsa . |
| 4,298,042 | 11/1981 | Peltola . |
| 4,354,539 | 10/1982 | Propst . |
| 4,382,457 | 5/1983 | Hahn . |
| 4,416,311 | 11/1983 | Gemmell-Murdoch . |
| 4,540,032 | 9/1985 | Pelletier et al. . |
| 4,552,191 | 11/1985 | Kuusilinna . |
| 4,565,486 | 1/1986 | Crawford et al. ........................ 144/4.1 |
| 4,569,379 | 2/1986 | Gemmell-Murdoch . |
| 4,583,908 | 4/1986 | Crawford ................................. 144/4.1 |
| 4,592,398 | 6/1986 | Golob et al. . |
| 4,763,742 | 8/1988 | Langford ................................. 144/4.1 |
| 4,779,654 | 10/1988 | Casperon et al. . |
| 4,784,195 | 11/1988 | Eggen . |
| 4,815,506 | 3/1989 | Kainz . |
| 4,913,203 | 4/1990 | Lessard . |
| 5,082,036 | 1/1992 | Vierikko . |
| 5,101,872 | 4/1992 | Scheuren . |
| 5,479,731 | 1/1996 | Widegren . |
| 5,732,754 | 3/1998 | Moisio . |

*Primary Examiner*—W. Donald Bray
*Attorney, Agent, or Firm*—Merchant & Gould P.C.

[57] ABSTRACT

A tree harvester provided with a rotatable worktable assembly is disclosed herein. The tree harvester includes a movable frame, a worktable assembly rotatably mounted to the movable frame and an upper frame rotatably mounted to the worktable assembly. The upper frame is provided with an articulated boom that includes a feller/grapple head. The worktable assembly includes a tree delimbing mechanism, a tree cutting mechanism and a log stacker. The operation of the worktable is advantageously automated so that the operator can use the boom while the worktable is processing a tree. The position of the worktable between the movable frame and the upper frame makes the tree harvester more compact than conventional tree harvester, while the independent rotation of the worktable assembly and of the upper frame with respect to the movable frame increases the flexibility of operation of the tree harvester.

19 Claims, 8 Drawing Sheets

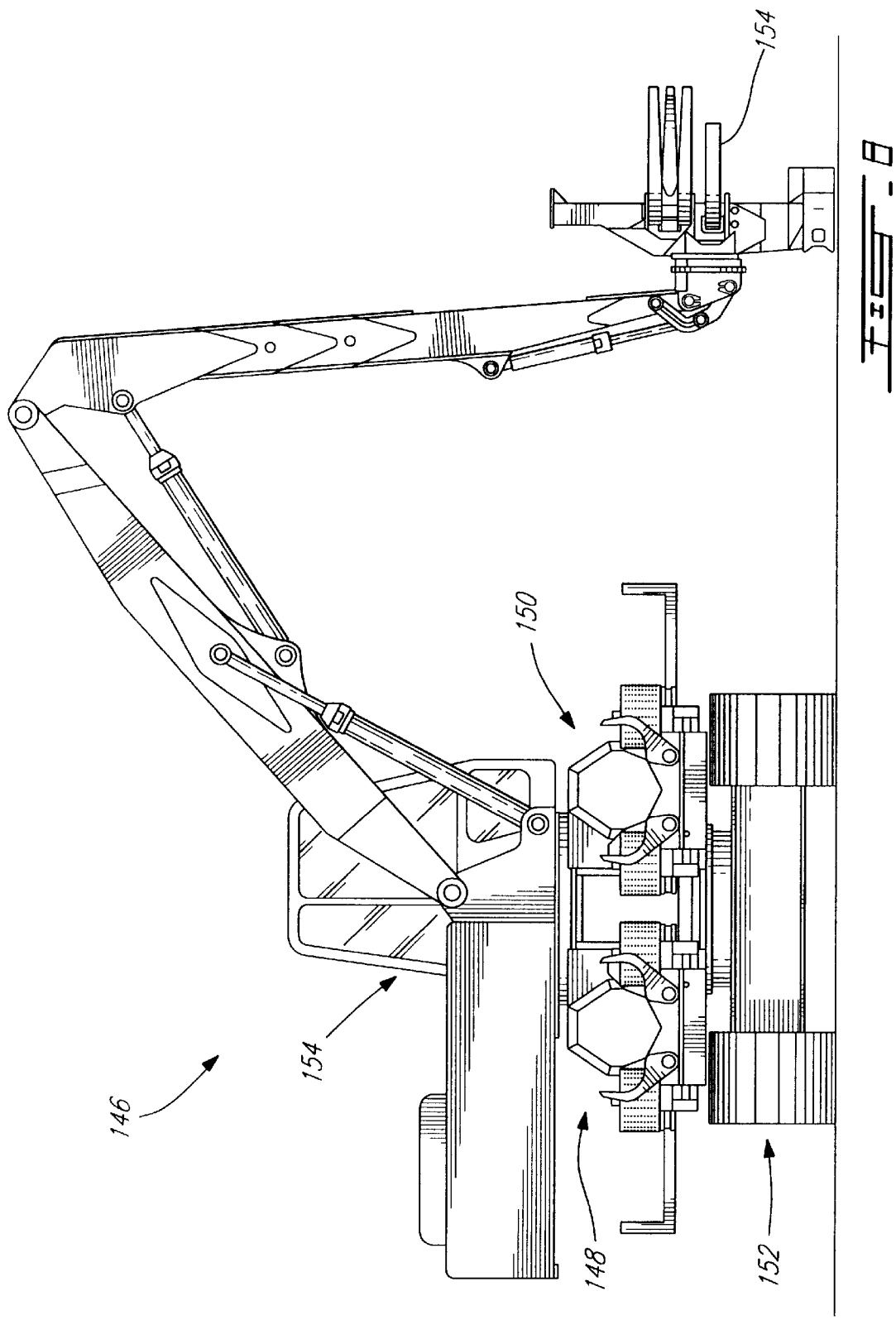

TREE HARVESTER PROVIDED WITH A ROTATABLE WORKTABLE

FIELD OF THE INVENTION

The present invention relates to tree harvesters. More specifically, the present invention is concerned with a tree harvester provided with a boom and a rotatable worktable assembly.

BACKGROUND OF THE INVENTION

There are two commonly known types of tree harvesters: single-grip harvesters and double-grip harvesters.

Single-grip harvesters have all their tree processing devices mounted on a single articulated boom. Such an harvester is disclosed in the U.S. Pat. No. 4,416,311, entitled "Tree Harvester", issued on Nov. 22, 1983 and naming Gemmell-Murdoch as inventor. Gemmell-Murdoch's harvester has a felling assembly and a delimbing assembly mounted on the same boom.

A drawback of Gemmell-Murdoch's harvester is that the boom is not available to process another tree or even to be repositioned to process another tree after the felling, since the boom is also used to delimb the tree. Furthermore, since the delimbing assembly is positioned on the boom, single-grip harvester's boom are usually heavy end bulky and can cause damages to the trees. Single-grip harvesters are therefore not particularly efficient.

On the other hand, double-grip harvesters have only their tree felling device mounted to the boom. The other tree processing devices are mounted on a worktable. An example of a double-grip harvester can be found in U.S. Pat. No. 3,805,859, entitled "Delimbing Assembly for a Tree Harvester" and issued to Kessler et al. on Apr. 23, 1974. Kessler's tree harvesting vehicle comprises a tree delimbing assembly mounted in front of the vehicle and an articulated boom that includes a tree felling assembly. After felling a tree, the boom brings the tree to the delimbing assembly. During the delimbing process, the boom can fell a second tree, therefore increasing the overall efficiency of the harvesting vehicle.

A drawback of Kessler's harvester is that the delimbing assembly is fixedly mounted to the vehicle. Indeed, the processed tree sometimes prevents free movement of the boom. Another drawback of Kessler's harvester is that it cannot accumulate trees after the delimbing process. The operation of the boom is therefore often stopped, since the boom has to remove the delimbed tree from the delimbing assembly.

A solution has been proposed to this problem by Hahn in U.S. Pat. No. 4,382,457, issued on May 10, 1983 and entitled "Tree Harvester". Hanh proposes a tree harvester provided with a bed, to delimb and cut a tree to a desired length, and a kickout table to receive and stack the severed logs. While Hahn's machine shows improvements over Kessler's, it presents the major drawback of being huge. This is a major drawback since the bigger the harvester and the greater the chance to damage the trees or the environment. Furthermore, Hahn's machine still has the same problem as Kessler's harvester regarding the fact that, the bed being fixedly mounted to the movable frame, it can sometimes prevent free motion of the boom.

OBJECTS OF THE INVENTION

An object of the present invention is therefore to provide an improved tree harvester free of the above mentioned drawbacks.

Another object of the invention is to provide a tree harvester that is configured to perform simultaneously different tree harvesting operations.

SUMMARY OF THE INVENTION

More specifically, in accordance with the present invention, there is provided a tree harvester comprising:

a movable frame;

a worktable assembly so mounted to the movable frame as to rotate about a first rotational axis; the worktable assembly being provided with at least one worktable mounted tree processing device; and an upper frame so mounted to the movable frame as to rotate about a second rotational axis; the upper frame being provided with a boom having proximate and distal ends; the proximate end being mounted to the upper frame; the distal end being provided with at least one boom mounted tree processing device.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 8 is a side elevational view of a second embodiment of tree harvester according to the present invention.

DESCRIPTION OF THE PREFERRED EMBODIMENT

Figure 1:
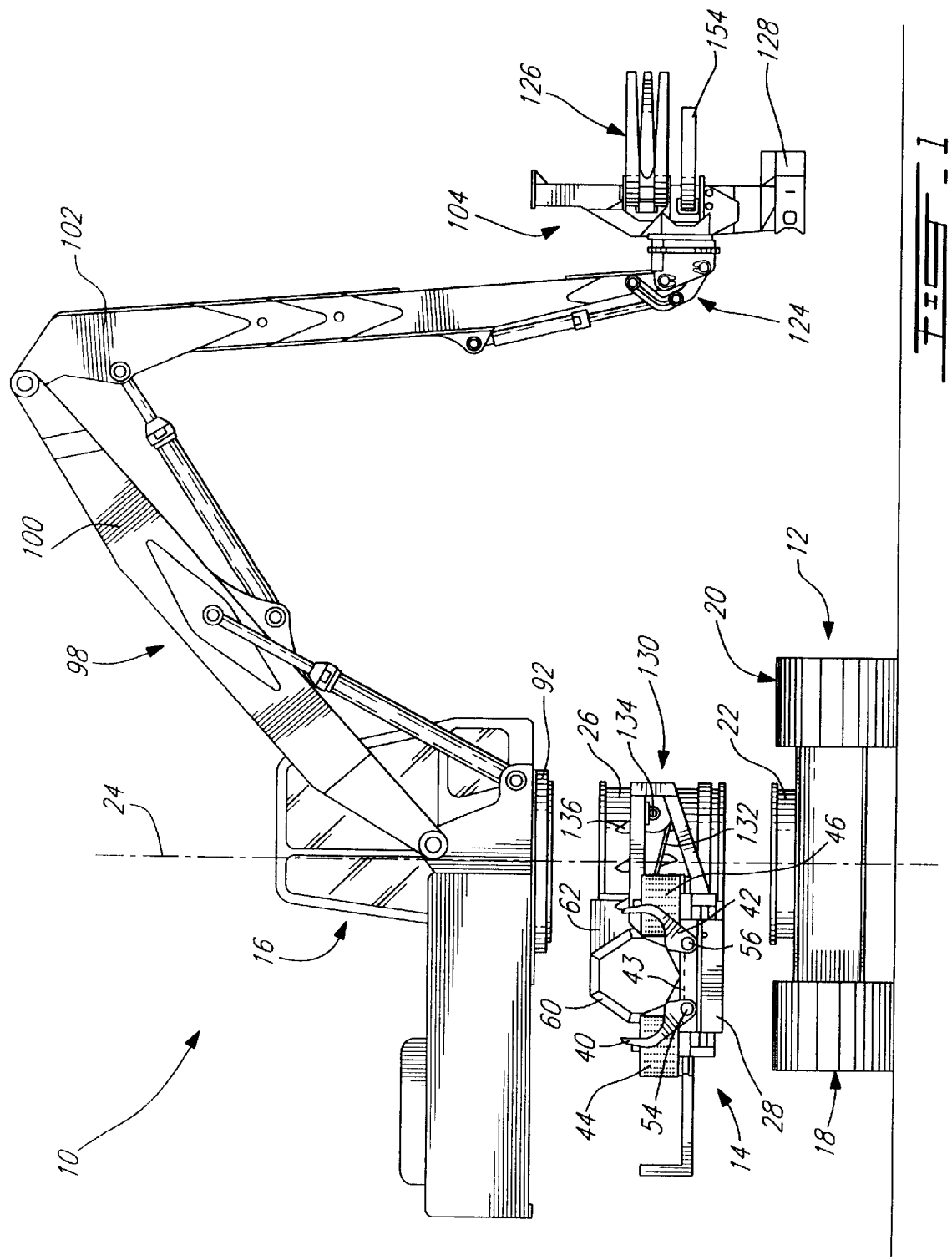
FIG. 1 is a front elevational view showing a tree harvester according to a first embodiment of the present invention; the rotatable worktable assembly being shown in front view while the upper frame being shown in side view.
Figure 2:
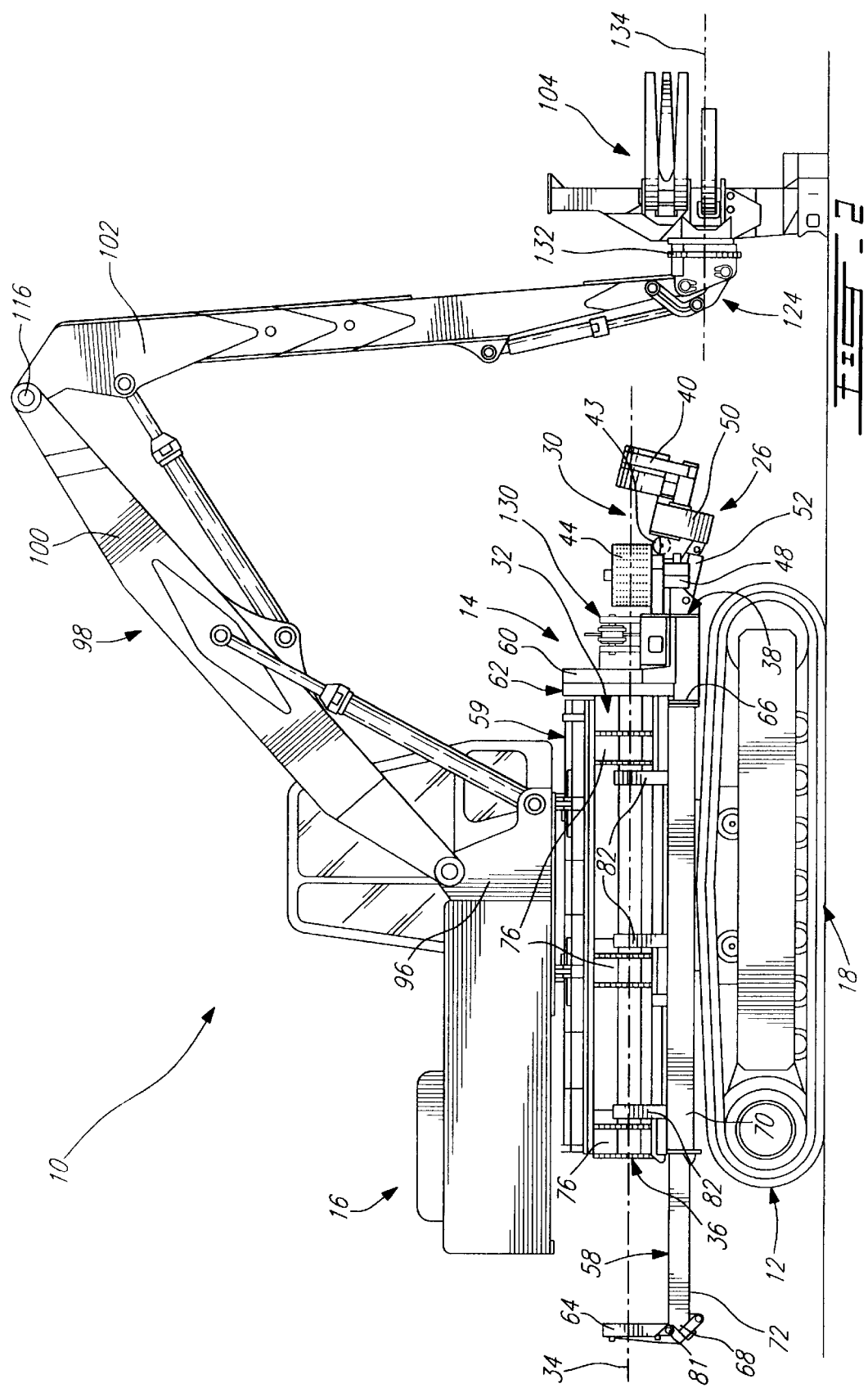
FIG. 2 is a side elevational view of the tree harvester of FIG. 1.
Figure 3:
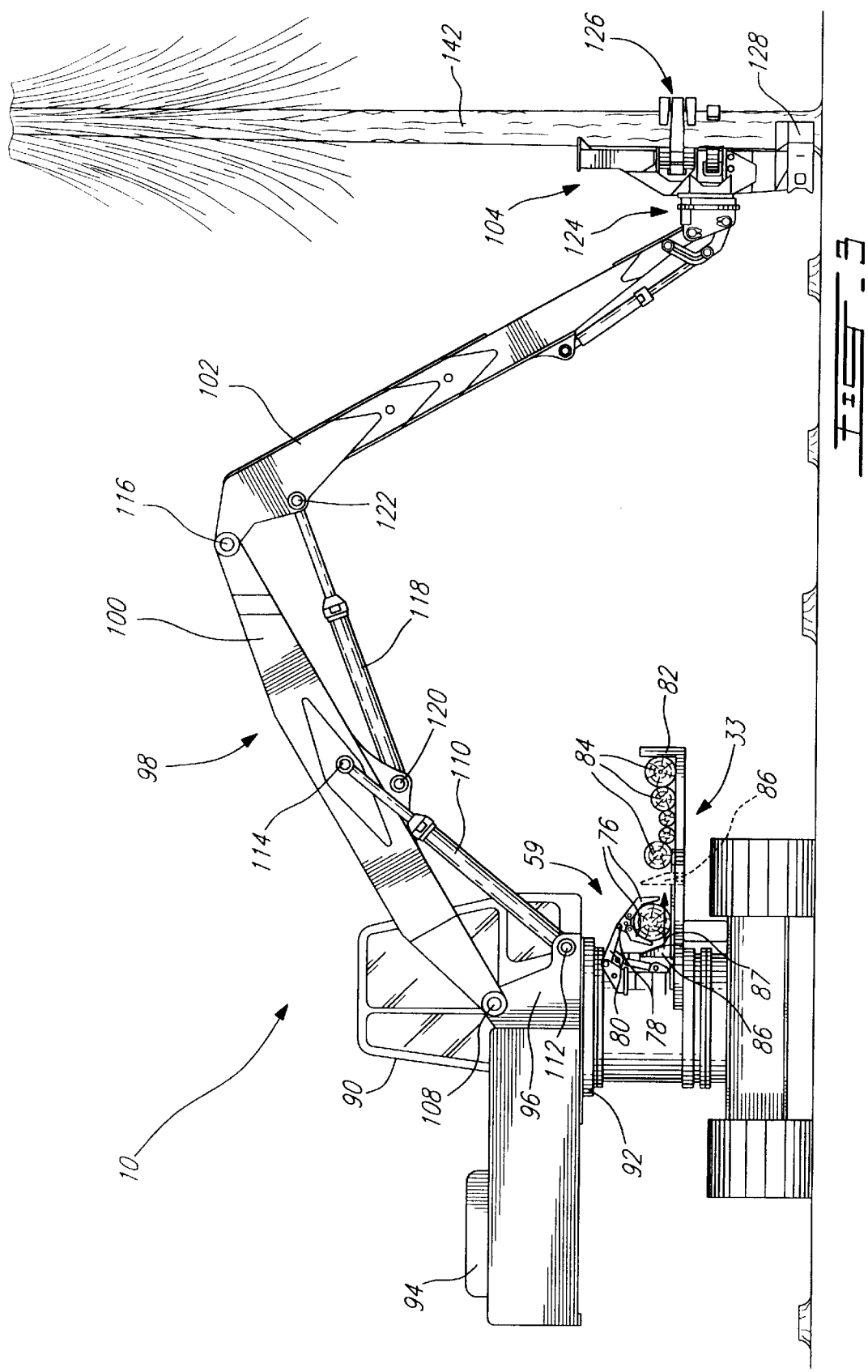
FIG. 3 is a front elevational view of the tree harvester of FIG. 1 illustrating the operation of the feller head and of worktable assembly.
Figure 4:
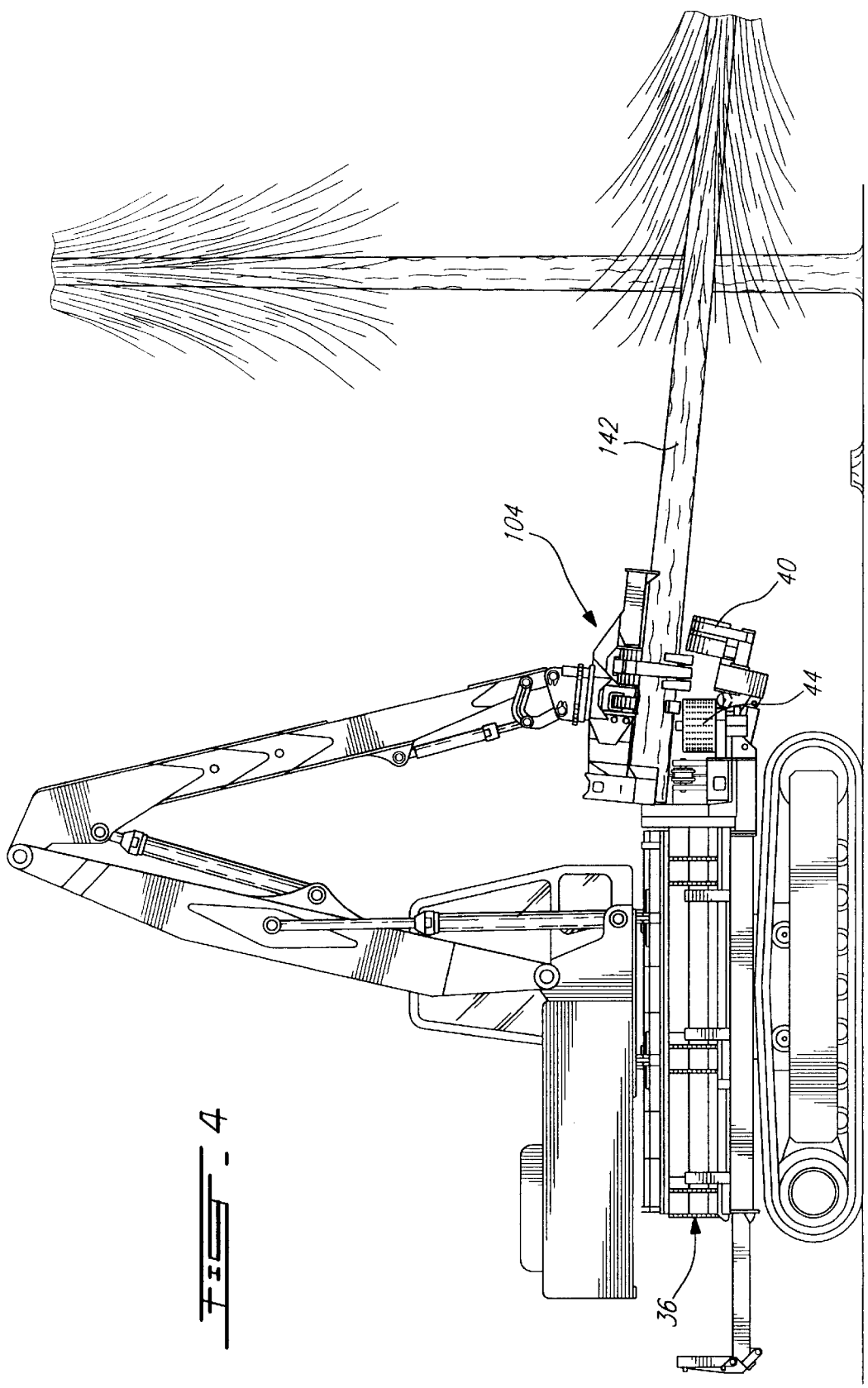
FIG. 4 is a front elevational view of the tree harvester of FIG. 1, illustrating the boom feeding a tree to the worktable assembly.

Referring to FIGS. 1 to 3 of the appended drawings, a tree harvester 10, according to a first embodiment of the present invention, will be described.

The tree harvester 10 comprises a movable frame 12, a rotatable worktable assembly 14 and an rotatable upper frame 16.

The movable frame 12 is similar to standard excavator frames and is therefore well known in the art. The movable frame 12 is power driven and includes endless tracks 18 and 20. The movable frame 12 further includes a turntable 22 centered about a rotational axis 24. Of course, wheels can be used instead of endless tracks.

The turntable 22 includes a fixed portion (not shown) fixedly mounted to the movable frame and a rotatable portion (not shown) rotatably mounted to the fixed portion.

The worktable assembly 14 includes a spacer 26, a worktable 28, a tree delimbing mechanism 30, a tree cutting mechanism 32 and a log stacker 33. The worktable assembly 14 is mounted to the rotatable portion of the turntable 22 of the movable frame 12 via the spacer 26. The spacer 26 is fixedly mounted to rotatable portion of the turntable 22. A power driving mechanism (not shown) drives the rotation of the rotatable portion the turntable 22 and therefore of the spacer 26 about the rotational axis 24.

The worktable 28 is mounted to the spacer 26 and consists of a longitudinal frame to which the other elements of the worktable assembly 14 are mounted. The worktable 28 includes a longitudinal axis 34 (FIG. 2) and two longitudinal ends 36 and 38. The worktable 28 is so configured and sized as to support the tree delimbing mechanism 30, the tree cutting mechanism 32 and the log stacker 33 and as to support horizontally a felled tree.

The tree delimbing mechanism 30 includes two knifes 40 and 42, a switch 43, two pull rolls 44 and 46 and an actuator mechanism 48. The pull rolls 44 and 46 are provided with projecting teeth to engage the wood of a tree. The pull rolls 44 and 46 are mounted to the worktable 28 at the longitudinal end 38 thereof. The actuator mechanism 48 is provided to control the relative distance between the two rolls 44 and 46 to enable the processing of trees of different sizes. The two rolls 44 and 46 are equally spaced apart from the longitudinal axis 34. The switch 43 is so positioned as to be pushed by a tree to trigger the actuator mechanism 48.

The knives 40 and 42 are mounted to a support 50 which is pivotally mounted to the worktable 28 via cylinder 52. The support 50 contains actuators (not shown) to control the pivoting of the knives 40 and 42 respectively about pivot pins 54 and 56 (FIG. 1). The knives 40 and 42 are symmetrically disposed about the longitudinal axis 34.

The tree cutting mechanism 32 includes a telescopic floor 58, a tree grabber 59, an engaging ring 60, a saw (not shown) mounted in a saw housing 62 and a mechanical stop 64. The telescopic floor 58 has two longitudinal ends 66 and 68, and is formed by tubes, such as for example, tube 70, in which is telescopically mounted a rod, for example rod 72. The tree grabber 59 includes three pairs of half-moon shaped claws 76, each secured on a pivot structure 78 (FIG. 3) allowing the claws to pivot between opened (not shown) and closed (see FIG. 3) positions. The pivot structure 78 is mounted to the worktable 28 via a hydraulic arm 80. The telescopic floor 58 and the tree grabber 59 are secured on the worktable 28 and are aligned with the longitudinal axis 34.

Figure 5:
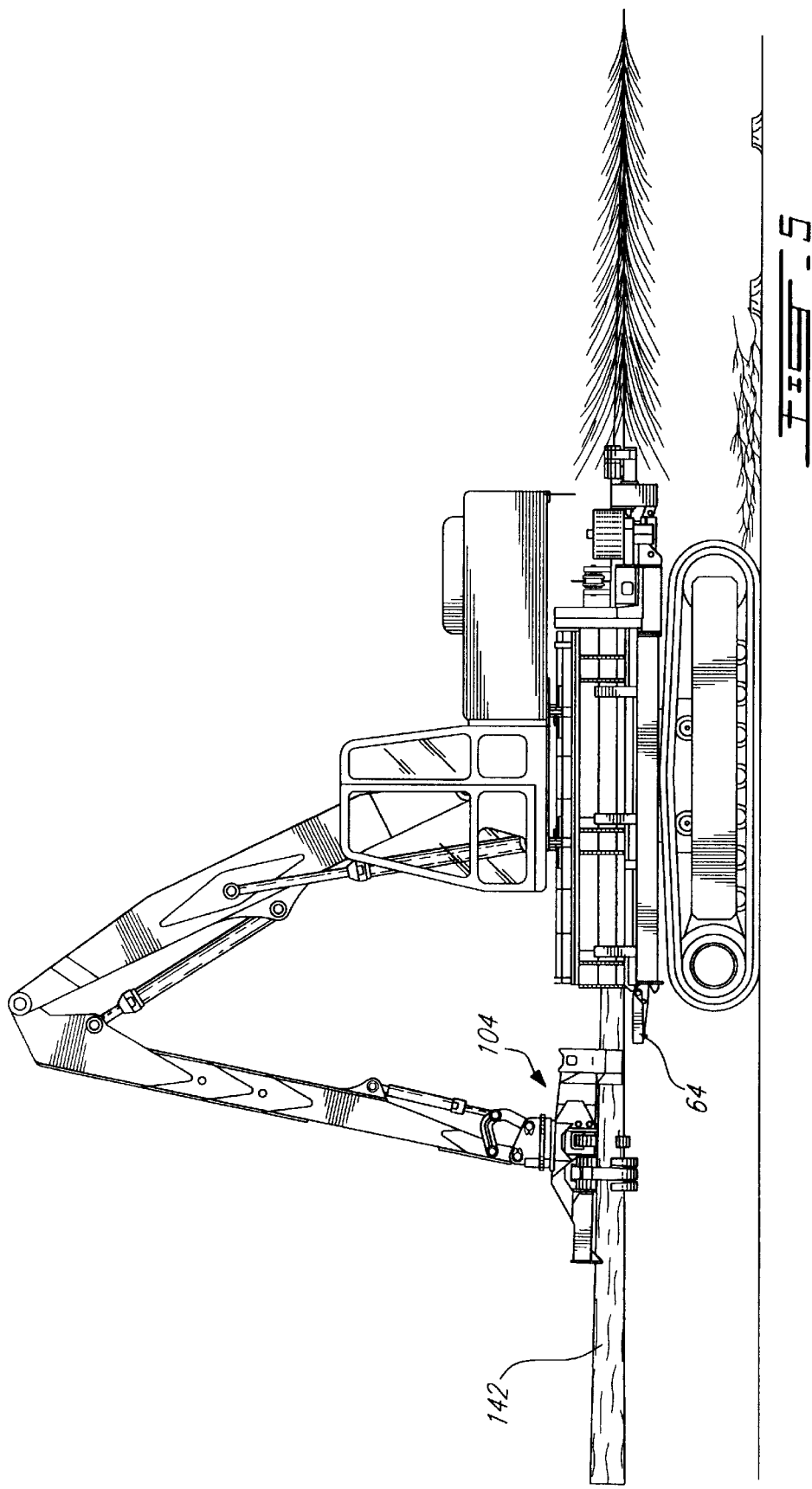
FIG. 5 is a front elevational view of the tree harvester of FIG. 1, illustrating the grapple grabbing a tree after the delimbing process.

The mechanical stop 64 is mounted to the telescopic floor 58, at the longitudinal ends 68, via a hinge mechanism 81 that allows the mechanical stop to be pivoted between an operating position (shown, for example, in FIG. 2) and a non-operating position (shown, for example, in FIG. 5). Since the telescopic floor 58 can move longitudinally along axis 34, the mechanical stop 64 can be positioned at different distances from the saw.

The engaging ring 60 and the saw housing 62 are mounted to the worktable 28, near the longitudinal end 38. The saw housing 62 is located behind the rolls 44 and 46, while the engaging ring 60 is located between the saw housing 62 and the rolls 44 and 46. The engaging ring 60 is generally centered about the longitudinal axis 34 and is used to align a tree with the longitudinal axis 34. As mentioned hereinabove, the saw housing 62 contains a chain saw (not shown) so mounted on a pivoting support (not shown) as to enable the cutting of a tree trunk going through the ring 60.

As can be better seen from FIG. 3, the log stacker 33 includes a rack 82, configured and sized to support a plurality of wood logs 84, and ejecting arms 86. The ejecting arms 86 are so mounted to the worktable 28 as to slide laterally relatively to the longitudinal axis 34 (see arrow 87), to therefore laterally move a cut log 84 from the worktable 28 to the rack 82 when the claws 76 are in their opened positions (not shown).

Returning to FIG. 1, the worktable assembly 14 is also provided with a tree conveyor 130 to feed trees to the tree delimbing mechanism 30. The conveyor 130 includes a strap 132, mounted on pulleys 134 (only one shown) and provided with teeth 136. A tree trunk placed between teeth 136 can be brought near the longitudinal axis 34 by the rotation of the pulleys 134.

The conveyor 130 therefore allows the user to cut trees faster than the worktable mounted tree processing devices may process them. It is to be noted that the conveyor 130 could be removed from the tree harvester 10 without departing from the spirit and nature of the present invention.

As can be better seen in FIG. 3, the upper frame 16 includes a crane room 90, a turntable 92, a counterweight 94, a boom support 96 and a conventional articulated boom 98. The upper frame 16 is rotatably mounted to the spacer 26 via the turntable 92, which is fixedly mounted to the upper frame 16. The boom support 96 is secured to the crane room 90.

The articulated boom 98 includes a jib 100, an arm 102 and a conventional feller head 104. The jib 100 includes a proximate end pivotally mounted to the boom support 96 via pivot pin 108. The pivotal movements of the jib 100 relative to the upper frame 16 are actuated by a hydraulic actuator 110, mounted to the boom support 96 and to the jib 100 via respective pivots pins 112 and 114.

The arm 102 includes a proximate end pivotally mounted to the distal end of the jib 100 via a pivot pin 116. The pivotal movements of the arm 102 relative to the jib 100 are actuated by a hydraulic actuator 118, mounted to the jib 100 and to the arm 102 via respective pivots pins 120 and 122.

The feller head 104 is so mounted to the distal end of the arm 102, via an attachment 124, as to be able to pivot and rotate freely in all directions. The feller head 104 is equipped with a grapple 126 and a retractable cutter (not shown) mounted in a protecting box 128. For space saving the cutter is preferably a chain saw.

Finally, it is to be noted that the elements may be secured to one another by welding or other fastening means.

A control station (not shown), advantageously located in the crane room of the upper frame 16, commands and synchronizes the operation of the tree processing devices of the worktable 28 and of the feller head 104.

The control station advantageously includes a controller circuit (not shown) allowing sequences of operation to be performed without the constant involvement of the user. Different sensors, such as, for example switch 43, may be provided to supply data to the controller circuit. The control station also preferably includes manual override features allowing the user to manually operate the various tree processing devices and the turntables 22 and 92.

It is to be noted that the movement of the jib 100, the arm 102 and of the feller head 104 are actuated via conventional controls (not shown), located in the crane room 90.

The telescopic floor 58 can be moved manually before the beginning of the process, to set a predetermined length for the cut logs, or automatically from the crane room 90, if adequate actuators (not shown) are provided between the telescopic tubes and rods of the floor 58.

Referring now to FIGS. 3 to 7, the operation of the tree harvester 10 will be described. The operation of the tree harvester 10 consists generally of the following steps:

felling a tree via the feller head 104;
feeding the tree to the worktable assembly;
delimbing of the tree;
cutting the tree in logs;
accumulating the logs in the log stacker; and
emptying the log stacker.

An advantage of the present invention is that the feller head 104 may fell other trees and place them onto the conveyor 130 while the worktable assembly delimbs the first tree, cuts it in logs and accumulates the logs.

In FIG. 3, the tree harvester 10 is first brought near a tree 142 to be felled which is grabbed by the grapple 126 of the feller head 104. The flexibility of the attachment 124 allows a perfect positioning of the feller head 104 on the tree 142. The chain saw of the feller head then gets out of its protecting box 128 to cut the tree 142, while the grapple firmly maintains the tree 142. The boom 98 brings the tree 142 in a horizontal orientation (see FIG. 4).

The next step is either to bring the trunk of the tree 142 to the engaging ring 60 if the cut tree 142 is to be processed immediately or onto the conveyor 130 if the cut tree 142 is to be processed later. As mentioned hereinabove, the operation of the conveyor 130 can be controlled by the operator or can be triggered by a sensor (not shown) that detects the absence of a tree in the tree delimbing mechanism 30. Depending of the size of the conveyor 130, several trees can be stacked, waiting to be processed by the worktable 28.

If the tree 142 is to be processed immediately, the tree 142 is brought between the two rolls 44 and 46 (see on FIG. 4) by the boom 98 and the weight of the tree 142 triggers the automatic processing cycle when the tree 142 actuates the switch 43. The knives 40 and 42 are then closed about the trunk of the tree 142 and the rolls 44 and 46 are energized via the actuator mechanism 48 to move the tree 142 toward the near end 36 of the worktable 28 while the knives 40 and 42 delimbs the tree 142.

At this point, the tree 142 can either be taken by the grapple 126 of the feller head 104 to be positioned somewhere on the ground without further processing, or cut into logs of predetermined length.

It is to be noted that, in the first case, the mechanical stop 64 is in its non operating position as can be seen in FIG. 5 where the feller head 104 grabs the tree 142 after the delimbing process. It illustrates one of the advantages of the attachment of the upper frame 16 that can rotate over 360 degrees.

If the tree 142 is to be cut to a predetermined length, the mechanical stop 64 is in its operating position (see for example FIG. 6) and it stops the longitudinal movement of the tree 142 when the predetermined length is reached. A log may then be cut with the chain saw of the tree cutting mechanism 32. It is to be noted that the telescopic floor 58 is set as to have a predetermined distance between the mechanical stop 64 and the chain saw. When a log is cut, it is transferred to the side rack 82 by the ejecting arms 86.

It is to be noted that, as mentioned hereinabove, all the processing done by the worktable 28 is advantageously automated so that the operator can turn his attention to the boom 98 to fell another tree.

Figure 6:
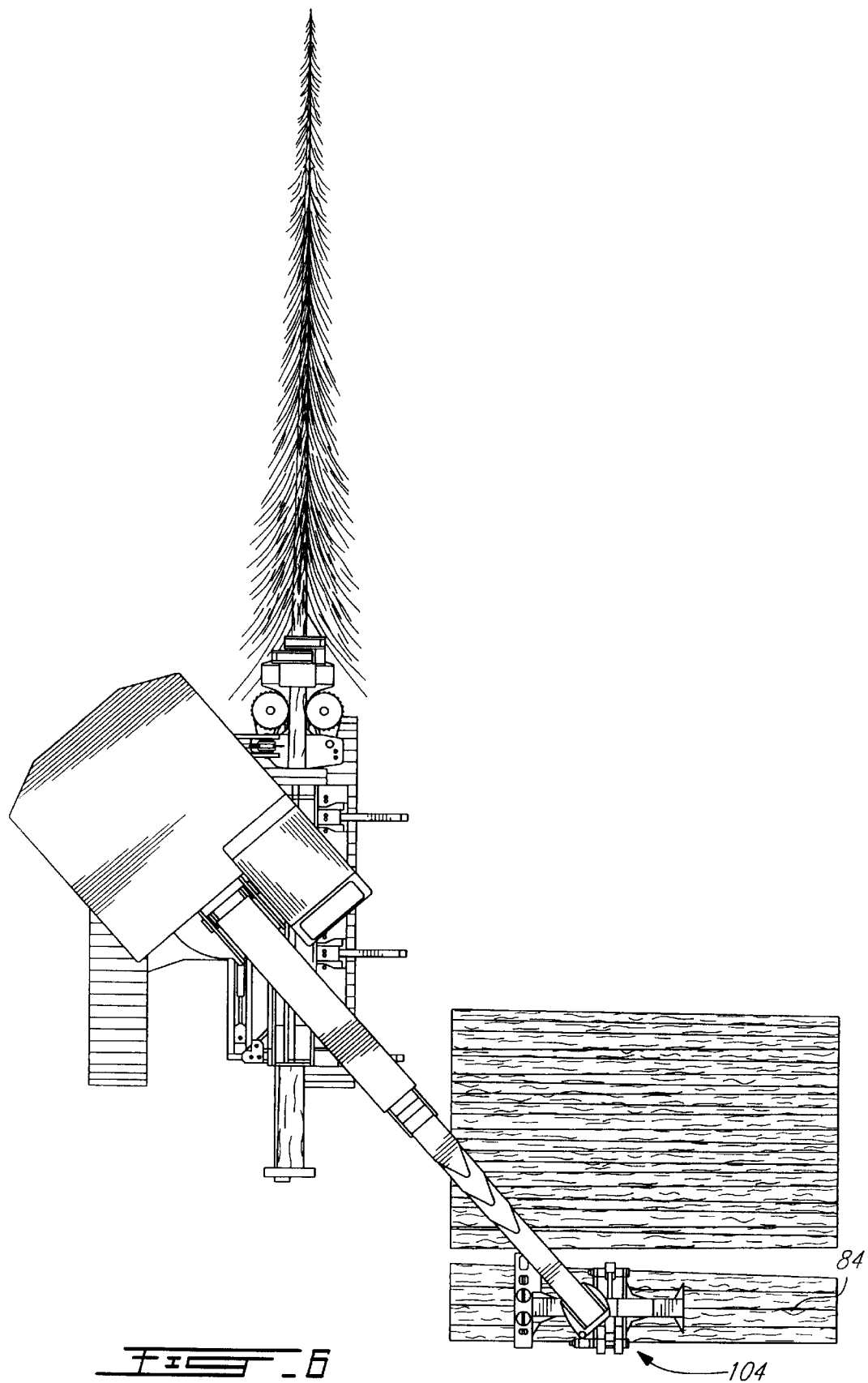
FIG. 6 is a top plan view of the tree harvester of FIG. 1, illustrating the multi-processing capability of the tree harvester.

As shown in FIG. 6, the feller arm 104 can also be used to remove logs 84 from the rack 82 and place them a desired location on the ground. FIG. 6 also illustrates the fact that the boom 98 can be used for other tasks, although a tree is being processed by the worktable 28.

Figure 7:
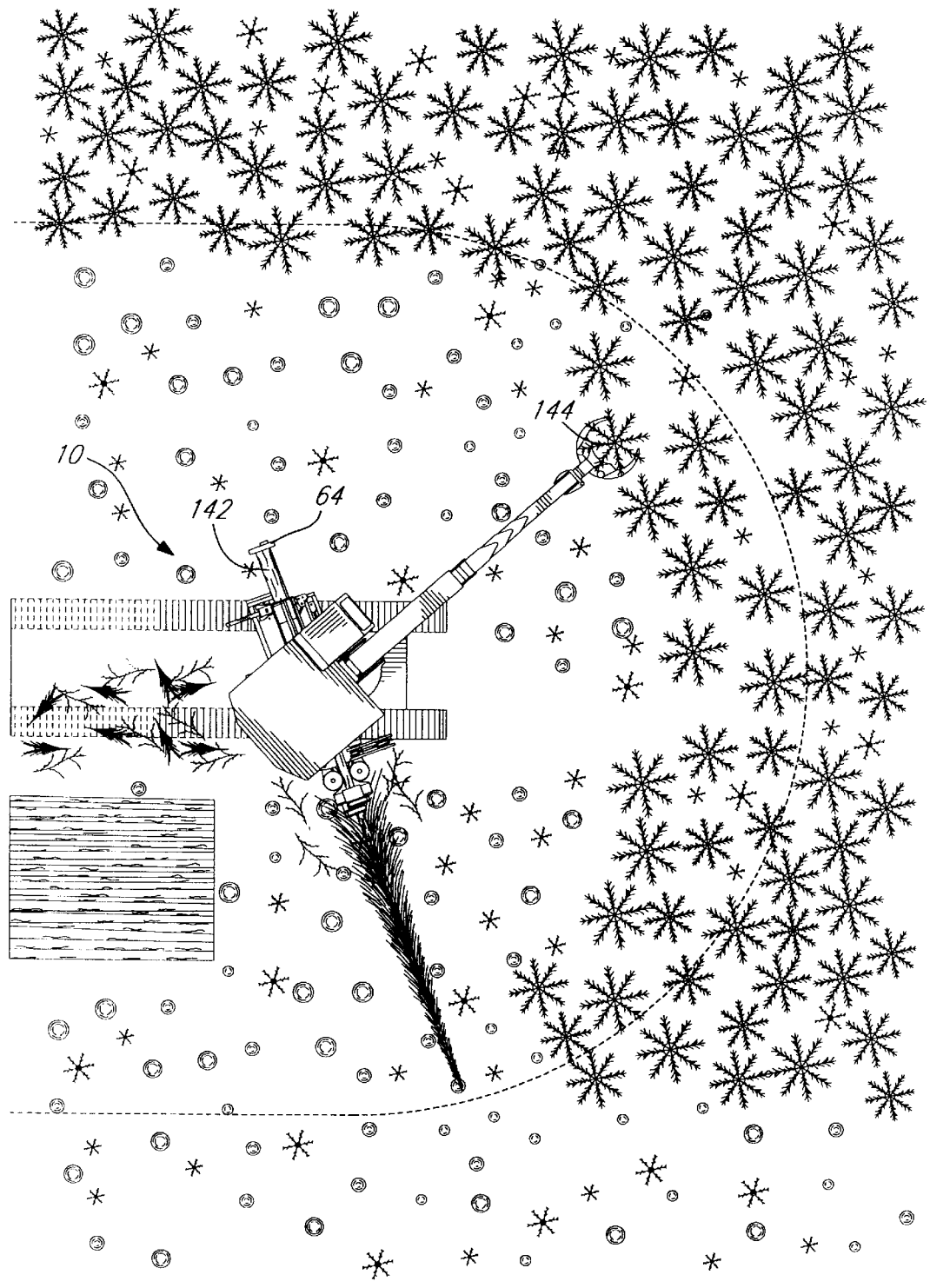
FIG. 7 is top plan view of the tree harvester of FIG. 1, illustrating the operation of the tree harvester.

FIG. 7 shows the tree harvester 10 grabbing a tree 144, while another tree 142 is being delimbed and cut (the mechanical stop 64 is in its operating position) by the worktable 28. FIG. 7 further illustrates another advantage of the fact that both the upper frame 16 and the worktable assembly 14 may freely and independently rotate about the rotational axis 24. Indeed, the rotation of the worktable 28 allow the processed tree to be in a direction clear of standing trees.

The boom 98 can reach trees over a 360 degrees radius without displacement of the tree harvester 10, therefore decreasing the displacements of the harvester 10 to help protect the environment by not damaging the soil or other trees not to be felled. Similarly, since the felled trees or the logs are placed on the ground via the feller head 104 and not dumped automatically, the soil is less damaged.

It is to be noted that the control of all the tree processing devices of the tree harvester 10 have not been described in great details herein since they are believed to be well known to one skilled in the art. 14

Turning now to FIG. 8 of the appending drawings, a tree harvester 146 according to a second embodiment of the present invention is shown. The tree harvester 146 is very similar to the tree harvester 10 of FIGS. 1 to 7 and therefore, for concision purposes, only the differences between these harvesters will be described hereinafter.

The major difference between the tree harvesters 146 and 10 is that the tree harvester 146 comprises two worktables assemblies 148 and 150 between the movable frame 152 and the upper frame 154, therefore allowing two trees to be processed simultaneously., while the feller head 104 fells another tree. It is also to be noted that, since the worktables are mounted between the movable frame 152 and the upper frame, 154 the addition of a second worktable does not make the tree harvester 146, substantially wider than the tree harvester 10.

Another difference between the tree harvesters 10 and 146 is that the tree harvester 146 is not equipped with a conveyor.

It is to be noted that, although the tree harvesters 10 and 146 have been described with a feller head having a single grapple, they can also be provided with a second grapple 154 to hold another tree.

It is also to be noted that other processing devices could be attached on the boom or on the worktable without departing from the spirit and nature of the present invention. The processing devices, described hereinabove can also take other forms. For example, the tree cutting mechanism can be equipped with trenching knifes.

The tree harvester according to the present invention has been described hereinabove with a worktable assembly and an upper frame rotating about superposed rotational axis. However, one skilled in the art could design a tree harvester where the worktable assembly and the upper frame would rotate about distinct rotational axis.

Although the present invention has been described hereinabove by way of preferred embodiments thereof, it can be modified, without departing from the spirit and nature of the subject invention as defined in the appended claims.

What is claimed is:

1. A tree harvester comprising:
   a movable frame;
   a worktable assembly so mounted to said movable frame as to rotate about a first rotational axis; said worktable assembly being provided with at least one worktable mounted tree processing device; and an upper frame so mounted to said movable frame as to rotate about a second rotational axis; said upper frame being provided with a boom having proximate and distal ends; said proximate end being mounted to said upper frame; said distal end being provided with at least one boom mounted tree processing device.

2. A tree harvester comprising:

a movable frame;

a worktable assembly so mounted to said movable frame as to rotate about a first rotational axis; said worktable assembly being provided with at least one worktable mounted tree processing device; and an upper frame so mounted to said movable frame as to rotate about a second rotational axis; said first and second rotational axes being superposed; said upper frame being provided with a boom having proximate and distal ends; said proximate end being mounted to said upper frame; said distal end being provided with at least one boom mounted tree processing device.

3. A tree harvester as recited in claim 2, wherein said upper frame is mounted to said movable frame via said worktable assembly.

4. A tree harvester as recited in claim 3, wherein said movable frame further includes a first turntable rotatably mounting said worktable assembly to said movable frame.

5. A tree harvester as recited in claim 4, wherein said upper frame further includes a second turntable rotatably mounting said upper frame to said worktable assembly.

6. A tree harvester as recited in claim 2, wherein said at least one worktable mounted tree processing device is selected from the group consisting of a tree delimbing mechanism, a tree cutting mechanism, a log stacker and a tree conveyor.

7. A tree harvester as recited in claim 6, wherein said tree cutting mechanism includes:

a longitudinal frame mounted to said worktable assembly and having first and second longitudinal ends;

an engaging ring mounted to said frame proximate to said first longitudinal end;

a telescopic floor including at least one tube mounted to said frame and at least one rod telescopically mounted in said at least one tube; said at least one rod having a distal end;

a mechanical stop mounted to said distal end of said at least one rod;

a tree grabber including at least two claws so mounted to said frame as to pivot between opened and closed positions; and a saw mounted to said frame proximate to said first longitudinal end;

whereby, in operation, said at least one rod is so positioned as to provide a predetermined length between said mechanical stop and said saw.

8. A tree harvester according to claim 6, wherein said mechanical stop is so mounted to said distal end of said at least one rod as to pivot between operating and non-operating positions.

9. A tree harvester as recited in claim 6, wherein said saw is protected by a saw housing.

10. A tree harvester as recited in claim 6, wherein said tree delimbing mechanism includes:

a longitudinal frame to support a felled tree; said longitudinal frame being mounted to said worktable assembly and having first and second longitudinal ends;

a pair of pull rolls mounted to said longitudinal frame proximate to said first longitudinal end; said pair of pull rolls including projecting teeth configured and sized to engage the felled tree; and first and second knives so mounted to said longitudinal frame proximate to said first longitudinal end; said first and second knives being so mounted to said longitudinal frame as to pivot between opened and closed positions.

11. A tree harvester as recited in claim 6, wherein said log stacker includes at least one ejecting arm.

12. A tree harvester as recited in claim 1, wherein said at least one boom mounted tree processing device is selected form the group consisting of a grapple and a tree cutter.

13. A tree harvester as recited in claim 1, wherein said boom mounted tree processing device includes a feller head provided with a grapple and with a tree cutter.

14. A tree harvester as recited in claim 1, further comprising a controller circuit automating the operation of said at least one worktable mounted tree processing device.

15. A tree harvester as recited in claim 1, further comprising a controller circuit automating the operation of said at least one boom mounted tree processing device.

16. A tree harvester as recited in claim 1, further comprising a second worktable assembly.

17. A tree harvester as recited in claim 1, wherein said movable frame includes endless tracks.

18. A tree harvester as recited in claim 1, wherein said movable frame includes wheels.

19. A tree harvester as recited in claim 1, wherein said upper frame includes a crane room.

* * * * *